(12) United States Patent
Auffret et al.

(10) Patent No.: US 11,185,991 B2
(45) Date of Patent: Nov. 30, 2021

(54) SURFACE-MACHINING ASSEMBLY COMPRISING AN EFFECTOR TO BE MOUNTED ON A ROBOT ARM AND AT LEAST ONE EFFECTOR BEARING ELEMENT BY MEANS OF WHICH THE EFFECTOR BEARS ON THE SURFACE AND/OR ON THE TOOLS WITH A BALL JOINT PROVIDED THEREBETWEEN

(71) Applicants: PRECISE FRANCE, Peillonnex (FR); LE CRENEAU INDUSTRIEL, Annecy-le-Vieux (FR)

(72) Inventors: Alain Auffret, Peillonnex (FR); Cédric Bastien, Saint-Jeoire-en-Faucigny (FR)

(73) Assignee: LE CRENEAU INDUSTRIEL, Annecy-le-Vieux (FR)

( * ) Notice: Subject to any disclaimer, the term of this patent is extended or adjusted under 35 U.S.C. 154(b) by 222 days.

(21) Appl. No.: 16/315,047

(22) PCT Filed: May 29, 2017

(86) PCT No.: PCT/EP2017/062849
§ 371 (c)(1),
(2) Date: Jan. 3, 2019

(87) PCT Pub. No.: WO2018/007067
PCT Pub. Date: Jan. 11, 2018

(65) Prior Publication Data
US 2019/0308328 A1    Oct. 10, 2019

(30) Foreign Application Priority Data

Jul. 8, 2016 (FR) ..................................... 1656613

(51) Int. Cl.
*B25J 11/00* (2006.01)
*B64F 5/10* (2017.01)
(Continued)

(52) U.S. Cl.
CPC ............... *B25J 11/005* (2013.01); *B23Q 1/28* (2013.01); *B23Q 3/069* (2013.01); *B25J 9/1015* (2013.01);
(Continued)

(58) Field of Classification Search
CPC .... B25J 11/005; B25J 9/1015; B25J 15/0095; B25J 18/04; B64F 5/10; B23Q 1/28; B23Q 3/069
See application file for complete search history.

(56) References Cited

U.S. PATENT DOCUMENTS 2,866,367 A   8/1955 Wilkes
4,523,100 A   6/1985 Payne
(Continued)

FOREIGN PATENT DOCUMENTS

DE   102009054604    * 12/2009 ............... B26D 7/26
DE   10 2009 054 604 A1   6/2011
DE   20 2013 104 389 U1   1/2015

OTHER PUBLICATIONS

International Search Report for corresponding International Application No. PCT/EP2017/062849 dated Aug. 4, 2017.

*Primary Examiner* — Zakaria Elahmadi
(74) *Attorney, Agent, or Firm* — Pearne & Gordon LLP

(57) ABSTRACT

The present application relates to a machining assembly comprising an effector intended to be mounted on a robot with multiple degrees of freedom, in which invention the mounting of the motor spindle relative to the intermediate supports and frame of the effector allows a numerically controlled movement along three axes X, Y, Z of a trihedron, the effector bearing on the piece to be machined or on the surrounding tools by means of a ball joint at the foot end of the effector. Since the effector bears on the piece to be machined or on the surrounding tools it is possible to create (Continued)

local stiffness and to obtain the precision required to guarantee the quality of the machining process.

13 Claims, 2 Drawing Sheets

(51) Int. Cl.
  *B23Q 1/28*  (2006.01)
  *B23Q 3/06*  (2006.01)
  *B25J 9/10*  (2006.01)
  *B25J 15/00*  (2006.01)
  *B25J 18/04*  (2006.01)

(52) U.S. Cl.
  CPC ........... *B25J 15/0095* (2013.01); *B25J 18/04* (2013.01); *B64F 5/10* (2017.01); *B23Q 2220/006* (2013.01)

(56) References Cited

U.S. PATENT DOCUMENTS

| | | | |
|---|---|---|---|
| 5,156,772 A * | 10/1992 | Allan | H01B 1/22 |
| | | | 252/512 |
| 6,577,804 B2 * | 6/2003 | Murakami | G02B 6/25 |
| | | | 225/96 |
| 9,339,942 B2 * | 5/2016 | Steingrueber | B26F 3/04 |
| 9,771,298 B2 * | 9/2017 | Linnhoff | C03B 33/037 |
| 10,351,460 B2 * | 7/2019 | Brown | C03B 33/107 |
| 10,479,725 B2 * | 11/2019 | Schulz | C03C 17/3644 |
| 2002/0069736 A1 * | 6/2002 | Yasoda | H05K 3/0052 |
| | | | 83/62.1 |
| 2005/0056127 A1 * | 3/2005 | Yamabuchi | C03B 33/07 |
| | | | 83/13 |
| 2007/0133911 A1 * | 6/2007 | Nishimoto | F16C 17/107 |
| | | | 384/100 |
| 2009/0047086 A1 * | 2/2009 | Liu | B24B 41/04 |
| | | | 409/231 |
| 2010/0005941 A1 * | 1/2010 | Schueppstuhl | B26D 7/20 |
| | | | 83/879 |
| 2010/0044350 A1 * | 2/2010 | Heiml | B23K 37/047 |
| | | | 219/121.14 |
| 2011/0307212 A1 * | 12/2011 | Nishikawa | G05B 19/401 |
| | | | 702/152 |
| 2014/0227055 A1 | 8/2014 | Mattia et al. | |
| 2015/0030405 A1 * | 1/2015 | Tsuruta | B23Q 11/04 |
| | | | 409/80 |
| 2015/0088454 A1 * | 3/2015 | Sugiyama | G01B 5/008 |
| | | | 702/155 |
| 2016/0184905 A1 * | 6/2016 | Tanaka | B23C 3/005 |
| | | | 409/138 |
| 2018/0056481 A1 * | 3/2018 | Yoshida | B24B 49/00 |

* cited by examiner

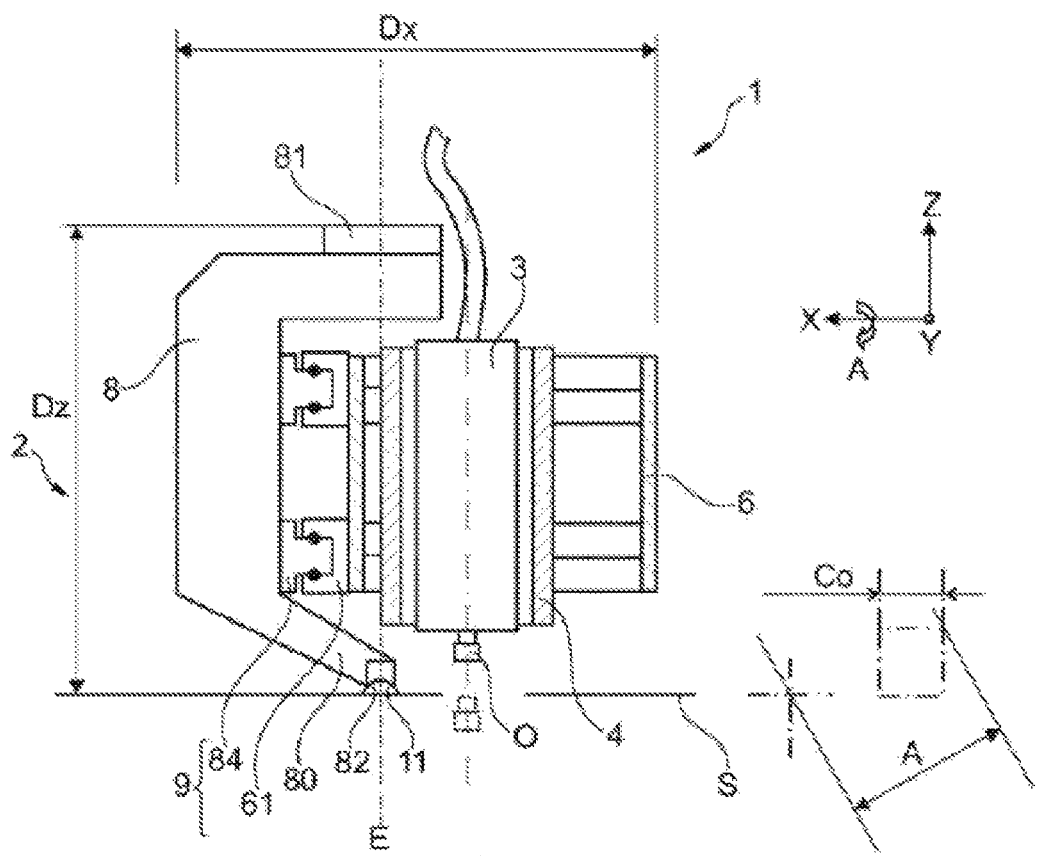
Fig. 1
Fig. 1A
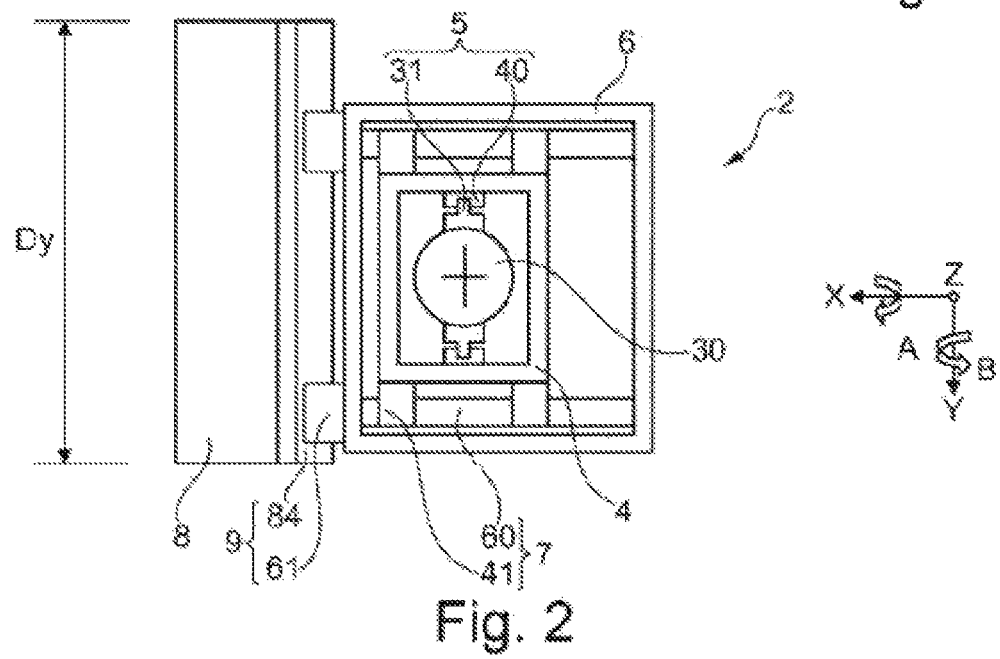
Fig. 2

SURFACE-MACHINING ASSEMBLY COMPRISING AN EFFECTOR TO BE MOUNTED ON A ROBOT ARM AND AT LEAST ONE EFFECTOR BEARING ELEMENT BY MEANS OF WHICH THE EFFECTOR BEARS ON THE SURFACE AND/OR ON THE TOOLS WITH A BALL JOINT PROVIDED THEREBETWEEN

TECHNICAL FIELD

The present invention concerns the general field of machining workpieces made of diverse and varied materials by means of a cutting tool. The machining may be milling, drilling or any other material removal process.

The invention aims to improve machining with a cutting tool so that it follows a trajectory in space with great precision and such stability that its trajectory is not significantly modified by the machining forces that are applied to it as a result of the machining operation.

The invention is relevant to numerous industrial applications. These are principally applications in which the machining to be carried out on the workpiece may be considered as a succession of local machining operations situated with precision in a frame of reference of the workpiece.

Of the numerous applications the following may be cited.

Firstly, in the aeronautical field, it may be a question of machining specific bores intended for fixings, such as drilled holes at the root of the wings of a new aircraft, where it joins to the fuselage, the drilled holes to be produced having to be cylindrical and/or conical, with large diameters in great thicknesses of material and/or in multi-material stacks, typically a carbon/titanium/aluminum stack.

It may equally be a question of a surface covering in the form of fuselage or wing composite material panels of an aircraft already in service that necessitate repair following an impact in service. The surfacing operation may then consist in creating pyramid shapes or so-called staggered steps to eliminate the zone of the panel or panels damaged by the impact.

The invention may advantageously also relate to the execution of precision machining on molds and workpieces of complex shape. Thus, it may be a question of producing tire molding tools, the object of which is the etching of the structure and markings identifying the tire.

It may equally be a question of machining complex shapes, usually executed on a numerically controlled machine tool (NCMT) with five or even six axes, of parts of a turbomachine such as a turbojet, machining in order to repair weld beads, a plurality of machining operations connected in automatically generated machining sequences.

In the field of cropping workpieces, the assembly according to the invention can make it possible to break a cropping contour down into a succession of local contour elements, connected to one another, in automatically generated machining sequences.

In the field of precision milling of large workpieces, the assembly according to the invention can execute milled surfaces with small dimensions broken down into a succession of local milling surface elements, connected to one another in automatically generated machining sequences.

In the field of finishing workpieces, it may be a question of deburring and highly accurate corner machining on shaped workpieces. The assembly according to the invention can execute deburring operations connected to one another in automatically generated machining sequences.

It is specified here that the three translation axes X, Y, Z referred to throughout the application are those of a reference trihedron defined in accordance with the AFNOR NF Z 60-020CN standard relating to numerically controlled machines.

The rotation axes A, B, C define rotation movements effected around axes parallel to X, Y and Z, respectively.

It is also specified that by "interpolated axes" is meant in the context of the invention the usual definition for interpolation machining that consists in machining a workpiece using the interaction of the drive spindles. During this type of machining, the spindles are necessarily not independent or connected.

PRIOR ART

In the field of surface-machining a workpiece, the equipment currently used may be classified into three major categories: drilling units that can be moved and operated manually by an operator, machine tools, and finally industrial robots.

Drilling units are routinely employed in the aeronautical industry to produce drilled holes in aircraft parts during assembly. They are placed on the workpiece concerned on drilling grids in housings provided for this purpose and locked in position by an operator. Once the drilling unit is locked in position, the operator triggers the machining-drilling cycle that then proceeds automatically, and when this is finished, they move the unit to the next location, and so on.

Known manual applications of drilling units are therefore very limited. Conceiving of an application that will go further, that is to say that would consist in having the operator move a small drilling machine (five-axis NCMT) the latter would necessarily have travels of very short amplitude, and therefore could not cover applications in which machining precisely requires a large amplitude.

A machine tool, a fortiori a special machine, is technically capable of executing machining operations of large amplitude. However, the disadvantages of a machine tool are numerous. It is often very bulky and offers little flexibility of use, because it is generally dedicated to only one application for which it was designed and therefore cannot easily be used for another application. Moreover, the financial investment necessary to acquire a machine tool is large, with a high risk of not proving cost-effective in the event of unfavourable evolution of the production workload.

Robots can have the free end of their articulated arm coupled directly to an electrospindle itself coupled to a cutting tool that it drives in rotation in order to execute machining operations on workpieces of complex shape. The cutting tool, which may be a drilling tool or a milling spindle is then carried by the terminal axis of the robot, which is usually referred to as axis 6.

Machining complex shapes by means of a robot directly equipped on its axis 6 with an electrospindle driving a cutting tool gives rise mainly to the following technical problems:

the flexibility or compliance of the arm of the robot, generally greater than 0.03 mm/daN, measured at the tip of the tool, greatly limits machining performance because of the amounts of swarf, if the aim is to avoid instability problems that consist in the trajectory errors induced by the cutting forces, and the surface states of the workpieces caused by vibrations during machining;

the precision of execution of the trajectories, of the order of a few tenths of a millimeter for a trajectory executed with no load, that is to say with no load on the cutting tool and therefore representative of a very light finishing pass, is often incompatible with workpiece machining geometrical tolerances.

The robot may also be equipped with a tool-holder, usually called an effector, which constitutes for it a small, light machining device, that it transports and positions at the various points of the workpiece to be machined.

To overcome the difficulties linked to the technical problems of robots directly equipped with electrospindles at the arm end, as described above, the effectors equipping machining robots are designed to come into bearing engagement with the workpiece or the tools that support it, so as to create local stiffness and to obtain the best machining performance, the machining trajectories being executed by the numerically controlled (NC) spindles of the effector, relative thereto.

Machining effectors are effectors generally limited to three NC axes, with very limited travels, of the order of a few mm.

US patent application 2014/0227055 describes a robot of this kind with an effector enabling execution bores by milling with three interpolated NC axes, with short travels of 5 mm on the X and Y axes.

This limitation to three interpolated NC axes is linked to fact that, until now, developing an effector with five interpolated axes with numerical control capable of relatively large travels on each axis that would enable the machining of complex shapes runs into the following difficulties:

lack of accuracy caused by the weight of the effector, making its transportation very delicate for the robot, with the possibility of deformation of its arm degrading de facto the accuracy of the robot;

investment costs, because the effector must be designed as a five-axis NC machine, that is to say with the addition of two rotation axes C and A (or A and B), in addition to the three linear translation axes X, Y and Z.

Because of these difficulties, there is preferred a machine tool solution with five NC axes, as already mentioned above, which undoubtedly has the advantage of having travels adapted to cover the complete volume of a workpiece to be machined, with better accuracy and better productivity but with the unavoidable disadvantages of being designated for a single application and its financial investment cost.

There are moreover known in the prior art particular effectors, known as hexapods, that carry an electrospindle and that are transported by the robot to be placed thereby in the same manner, bearing on the workpiece or the tools, in order to obtain the stiffness necessary for the machining process. There may be cited the CMW 380 hexapod from the French company ERIL.

However, although by virtue of its lightness and its intrinsic stiffness a hexapod effector could constitute a suitable technical response to the problem of machining complex shapes, its technical and industrial maturity is not yet proven.

In summary, although in the prior art there are already found solutions that enable the machining of complex shapes, the disadvantages specific to each solution remain.

There is therefore a need to propose a new solution for machining complex shapes, notably in order to avoid the aforementioned disadvantages of manual machining units, numerically controlled machine tools and robots with effectors such as already known.

The object of the invention is to address this need at least in part.

SUMMARY OF THE INVENTION

To this end, the invention concerns a surface-machining assembly, comprising:

an effector comprising:

an electrospindle comprising a body with at one of its ends means for coupling to a cutting tool, a first support connected to the body of the electrospindle by a sliding connection allowing movement in translation of the electrospindle along the rotation axis Z of the tool, a second support connected to the first support by a sliding connection allowing movement in translation of the first support along an axis X perpendicular to the rotation axis Z of the tool, a chassis one end of which constitutes a foot and the other end of which constitutes a head adapted to be coupled to the free end of a robot arm, the chassis being connected to the second support by a sliding connection allowing movement in translation of the second support along an axis Y perpendicular both to the translation axis X of the first support and to the axis Z of translation of the electrospindle and of rotation of the tool;

at least one bearing element enabling the foot of the effector to bear on the surface to be machined or on tools that support the surface, the bearing element and the foot of the effector being configured so that the effector is connected to the surface to be machined by a ball joint connection when the foot of the effector is bearing on the surface.

According to one embodiment, the end of the foot of the effector is constituted of a ball joint mounted inside a part and defining between them the ball joint connection, the part defining a bearing connection against the surface to be machined or against the tools. This bearing connection constitutes a plane bearing when the surface to be machined or of the tools is plane. When the surface to be machined or that of the tools is a skewed surface (in the mathematical sense of that term), the bearing element can have a countershape of the surface, in order for there to be no point contact and thus to increase the area of contact, which is favorable for absorbing cutting forces. According to this first embodiment, in order to eliminate any risk of slippage between the bearing element, care is taken that the contact force provided by the robot on which the effector is mounted takes account of the cutting forces and the machining position.

This first embodiment with ball joint foot and plane bearing enables there to be obtained an accuracy of location of the machining operations carried out by the effector in a frame of reference of the workpiece that is better than that made possible by the robot. This implies correcting the program of the effector at each machining position to take account of its real position. To this end, the person skilled in the art can employ the types of solution already known. Among these known solutions, there may be cited the solutions with measurement by tracking laser to identify the position of the effector in space or solutions with local measurement by triangulation sensors supported by the effector, which therefore itself identifies its position relative to the tools or to the workpiece to be machined.

According to a second embodiment, the end of the foot of the effector being conformed as a part-spherical dome, each bearing element being a stud in the form of a part-spherical dome, arranged on the surface to be machined or against the tools, the shape of the stud being complementary that of the end of the foot of the effector and defining the ball joint connection.

According to a third embodiment, the end of the foot of the effector being frustoconical, each bearing element being a stud in the form of a part-spherical dome, arranged on the surface to be machined or against the tools, the shape of the stud being complementary to that at the end of the foot of the effector and defining the ball joint connection.

According to these second and third embodiments, the assembly may comprise one or more studs formed integrally with the tools around the surface to be machined, or instead placed on the surface to be machined or on the tools around it that support the surface to be machined. The plurality of studs may advantageously be distributed along the contour of the surface to be machined. Each stud enables absorption of cutting forces and also accurate recentering of the foot of the effector bearing against the stud.

This solution with integrated studs or studs placed on the surface to be machined or on the tools provides a simple way to ensure the continuity of the segments of the machining contour. Moreover, this solution using studs makes it possible to avoid all risk of sliding eliminated, during machining, between the effector bearing element and the workpiece to be machined.

Compared to the first embodiment with the ball joint integrated in the foot of the effector, this solution with integrated or attached studs enables greater cutting power to be transmitted and therefore the productivity of machining to be improved.

The studs can be placed on the tools without great precision: it suffices initially to determine by an accurate measurement the positions of the centers of the part-spherical bearing surface of each stud, then to integrate them into the definition of the tools on a programming station, and subsequently to generate the corresponding machining program.

In this embodiment with integrated studs, the end of the foot is in fact automatically recentered accurately relative to the tools. At the level of the head of the effector, and to be more precise at the interface of the coupling flange of the end of the robot arm, given the lever arm ratio between a tip point of the tool and the center of the ball joint, and on the other hand center of the ball joint and coupling flange, the inventors believe that the inaccuracy of the robot at this point (effector head) will have an entirely negligible impact on the position of the tip of the tool.

The angular amplitude of the ball joint connection is preferably between ±10 and ±45° inclusive, preferably between ±15 and ±25° inclusive. Typically, it may be of the order of ±20°.

Advantageously, the first support supports the device driving movement in translation along the axis Z, the second support supports the device driving movement in translation along the axis X, and the chassis supports the device driving movement in translation along the axis Y.

Each drive device in translation is preferably a motor connected to a ball screw and nut system or a screw system with satellite rollers. In contrast to other drive devices, such as linear motors, drive devices with ball screw and nut or satellite roller screws have the advantage of enabling easier continuous balancing of their own weight carried by each support or chassis.

The invention also consists in a machining installation comprising a robot with six degrees of freedom, termed a six-axis robot, and an assembly as described above, the head of the effector being coupled to the free end of the arm of the six-axis robot. The load on the cutting tool transmitted by the robot may typically be of the order of 100 kg.

The invention also consists in a method of machining a surface executed by the installation described above, comprising the following steps:

a/ measuring the positions of the centers of the bearing surfaces of each of a plurality of studs;

b/ integrating the plurality of studs onto the tools to be placed around the surface to be machined;

c/ resting the effector foot on one of the studs and then machining the surface part in the vicinity of said stud, by means of a cutting tool coupled to the electrospindle, the machining being carried out with movement of the electrospindle in translation along the axis X and/or Y and/or Z and/or with rotation of the effector around the center of the ball joint and/or with rotation of the effector around its axis passing through the center of the ball joint and the center of the flange fixing the head to the arm of the robot;

d/ successively moving the effector by means of the robot so as to repeat the step c/ with the effector foot bearing on each of the plurality of studs, in order to execute the required machining of the whole surface.

In summary, the invention essentially consists in a machining effector intended to be mounted on a robot with a plurality of degrees of freedom and where the mounting of the electrospindle relative to its intermediate supports and its chassis enables movement along three numerical control axes X, Y, Z of a trihedron, the effector bearing on the workpiece to be machined or on the tools around it, by way of a ball joint connection at its foot end. The effector bearing on the workpiece or on the tools around it enables local stiffness and precision to be conferred that are necessary to ensure the quality of the machining process.

Accordingly, whilst maintaining the contact without slippage of the effector foot on the bearing surface, the inclination by the robot of the axis of the effector during the machining process around the center of the ball joint virtually generates the two rotation axes A and B complementary to the three interpolated translation axes X, Y and Z of the effector, which therefore enables the machining of complex shapes, with a quality equivalent to that obtained with a conventional NCMT with five (or more) numerical control axes, which is much more costly in terms of investment.

Moreover, during machining, a robot is able to orient the effector according to the invention as required about its axis defined as being the axis that passes through the center of the ball joint and the center of the flange for fixing the head of the effector to the robot. This makes it possible to solve many collision problems that could occur, during machining, between the effector and the robot, on the one hand, and the workpiece to be machined and its tools, on the other hand.

In other words, thanks to the assembly according to the invention, there is obtained the stiffness between the tip of the cutting tool and the surface of the workpiece to be machined that is indispensable for the machining process:

in translation on the three axes X, Y and Z, by the mastery of the contact without slippage of the bearing element of the effector foot on the workpiece or on the tools around it, in rotation about two virtual axes A and B, passing through the center of the ball joint, by virtue of the ratio between the lever arms on the one hand between the tip of the cutting tool and the center of the ball joint and on the other hand between the center of the ball joint and the center of the flange for fixing the head of the effector to the arm of the robot, in rotation about the axis of the effector, through the quality of some rotation axes of the robot which, where necessary, will have been revised beforehand, notably by the use of play compensation reduction gears, and by appropriate control of stiffness and accuracy, these components and the adjustments thereof being familiar to the person skilled in the art. The rotation about the axis of the effector makes it possible to increase the machining capacity of the effector and the capacity to machine complex shapes.

The solution according to the invention therefore makes it possible to machine complex shapes by means of an effector that includes only three numerical control axes X, Y, Z when the robot on which the effector is mounted does not have sufficient intrinsic stiffness to produce machining of good quality.

In other words, the same robot with the electrospindle coupled directly with the free end of the arm not having the effector according to the invention could not produce machining of good quality.

The succession of local machining operations on a workpiece executed by an assembly according to the invention may complement machining of the workpiece as a whole by means of a standard machine tool that is much more costly and bulky.

The inventors are of the opinion that all machining positions of the cutting tool relative to the workpiece to be machined are possible thanks to the assembly according to the invention: horizontal spindle, vertical spindle, etc.

DETAILED DESCRIPTION

Other advantages and features of the invention will emerge more clearly on reading the detailed description of embodiments of the invention given by way of nonlimiting illustration with reference to the following figures, in which:

FIG. 1 is a diagrammatic view in partial longitudinal section of an effector according to the invention bearing on the surface to be machined or the tools that support it;

FIG. 1A is a detail view showing the possible relative movement of the cutting tool mounted on the effector and the position relative to the center of the ball joint connection according to the invention at a given rotation position around the axis Z;

FIG. 2 is a diagrammatic top view of the effector from FIG. 1;

Figure 3:
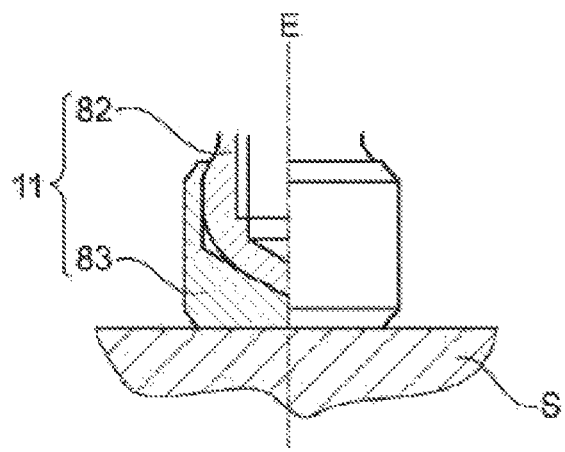
FIG. 3 is a detail view in partial section of the end of a foot of the effector according to a first embodiment of the invention employing a ball joint.

It is specified here that in the entirety of the present application the terms "lower", "upper", "over", "under", "interior", "exterior", "internal" and "external" are to be understood with reference to an effector according to the invention with its chassis and the cutting tool that it supports arranged on top of the surface S to be machined.

The assembly according to the invention designated overall by the reference 1 comprises first of all an effector 2.

The effector comprises first of all a machining electrospindle 3 the body 30 of which comprises at one of its ends means for coupling to a cutting tool O.

By way of illustrative example, the machining electrospindle 3 may have the following features:
diameter 80 mm,
nominal power rating 7 kW,
nominal rotation speed 25000 rpm,
nominal output torque 5 mN.

It may equally be an electrospindle of 150 mm diameter, nominal power rating 11 kW, nominal rotation speed 12000 rpm, and nominal torque of the order of 10 mN.

The effector 2 also comprises a first support 4 connected to the body 30 of the electrospindle by a sliding connection 5 allowing movement in translation of the electrospindle along the rotation axis Z of the cutting tool O. As in the example shown, this sliding connection 5 can be provided by means of two male structural sections 31 fastened to the body 30 of the electrospindle and each cooperating with a female structural section 40 fastened to the first support 4.

A second support 6 is connected to the first support 4 likewise by a sliding connection 7 allowing movement in translation of the first support 4 along an axis X perpendicular to the rotation axis Z of the tool. As in the example shown, this sliding connection 7 can be produced by means of two male structural sections 60, fastened to the second support 6 and each cooperating with a female structural section 41 fastened to the first support 4.

Finally, the effector 2 comprises a chassis 8 of U or C general shape. One of the ends of the chassis 8 constitutes a foot 80 and the other of its ends constitutes a head 81 adapted to be coupled to the free end of a multi-articulated robot arm, notably of a six-axis robot not shown.

The chassis 8 is connected to the second support 6 by a sliding connection (9) allowing movement in translation of the second support along an axis Y perpendicular both to the axis X of translation of the first support and the axis Z of translation of the electrospindle and rotation of the tool. As in the example shown, this sliding connection 9 may be produced by means of two male structural sections 84 fastened to the chassis and each cooperating with a female structural section 61 fastened to the second support 6.

Each of the structural members for producing the various sliding connections 5, 7 and 9 can for example be produced integrally with or welded or stuck or screwed to the components.

According to a first embodiment shown in FIG. 3, the end of the foot 80 comprises a ball joint 82 mounted inside a plane bearing part 83, defining a ball joint connection between them. Accordingly, thanks to the foot with ball joint 82 in series with the plane bearing part 83, the effector 2 is connected to the surface to be machined by a ball joint connection 11 when the foot of the effector bears on the surface.

Figure 4:
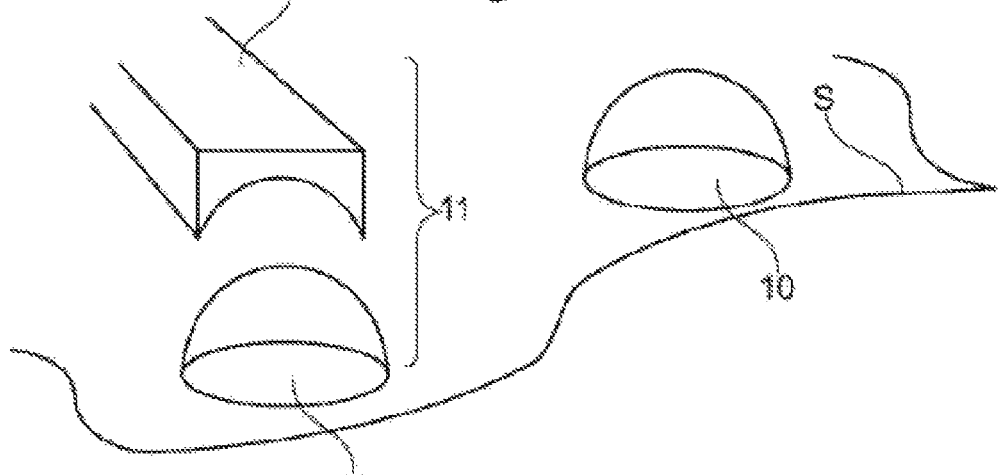
FIG. 4 is a diagrammatic perspective view of the end of the effector, intended to come to bear successively against a series of studs integrated into the tools of a surface to be machined, defining a ball joint connection according to a second embodiment of the invention.

According to a second embodiment shown in FIG. 4, the end of the foot 80 is conformed as a part-spherical dome that is complementary to that of a series of studs 10 integral with or mounted along the surface S to be machined or preferably on the tools that support it. Accordingly, the foot 80 of the effector bearing against one of the studs 10 defines with the latter the ball joint connection 11 according to the invention.

The assembly 1 according to the invention enables movement of the effector 2 along the three interpolated linear axes X, Y, Z with two rotation axes A and B obtained thanks to the movements of the robot causing the effector to pivot about the center of the ball joint 11, complemented by the real time movements of the linear axis, so as to obtain a position of the cutting tool O compatible with offline (RTCP) programming, at the tip of the tool.

Moreover, the movements of the robot enable there to be imparted to the effector 2 a movement of rotation about its axis, defined as passing between the center of the ball joint 11 and the center of the flange for fixing the head 81.

By way of illustration, the dimensions Dx, Dy and Dz are for example respectively equal to 700 mm, 650 mm and 700 mm.

Also by way of illustration, the travel C0 of the cutting tool that it is possible to obtain can be of the order of 100 mm and the distance A between the center of the ball joint 11 and the point of maximum separation of the cutting tool can be equal to 250 mm.

Finally, with a cutting tool of 20 mm diameter, the load capacity at the tool can be 100 daN, in the case of the first embodiment with the effector foot including the integral ball joint connection. The load capacity can be higher in the case of the second embodiment, i.e. with the effector bearing on part-spherical studs 10.

Although not shown, different drive systems are fastened to the first support 4, the second support 6 and the chassis 8 of the effector to provide the movement in translation along the axis Z, along the axis X and along the axis Y, respectively.

The inventors have already defined the first dimensioning elements for a machining robot for which an effector according to the invention would be suitable. Two examples of dimensions are indicated hereinafter in relation to industrial robots already commercially available.

Example 1

The Base of the Robot is a "Kuka KR 500" Six-Axis Robot

The load at the cutting tool of approximately 100 daN is absorbed by the plane bearing part 83 in contact with the surface to be machined, which must be applied to that surface with a normal force of 250 daN, considering a mean coefficient of adhesion of the order of 0.4 to prevent slippage.

The spindle 6 of the robot must be of the play compensation type and pre-loaded in the case of machining with a vertical or horizontal spindle.

The reducers of the axes 4 and 6 must therefore be capable of absorbing a torque C corresponding to the equation:

$C$=(max load at tool)*(maximum distance $A$ between center of ball joint 11 and point of maximum separation of cutting tool).

It is assumed that the stiffness of the reducers is such that, when loaded by the torque C, the resulting movement of the tip of the cutting tool remains less than the machining tolerances, for roughing or finishing.

Accordingly, with the above illustrative data, the torque C of the reducers must be equal to 100 daN×250 mm, that is to say 250 mN.

Example 2

The Base of the Robot is a "Staübli TX200" Six-Axis Robot

Assuming a bearing force of 100 daN transmitted by the robot, which corresponds to the nominal capacity of the robot, the load at the tool must remain below 40 daN, taking into account a coefficient of adhesion of the order of 0.4, and the torque of the cutting tool (spindle) must remain below 3.2 mN.

Accordingly, with the above illustrative data, the reducers for the supports 4 and 6 must therefore be capable of absorbing a torque C equal to 40 daN×250 mm, that is to say 100 mN.

Other variants and advantages of the invention may be produced without departing from the scope of the invention.

Figure 5:
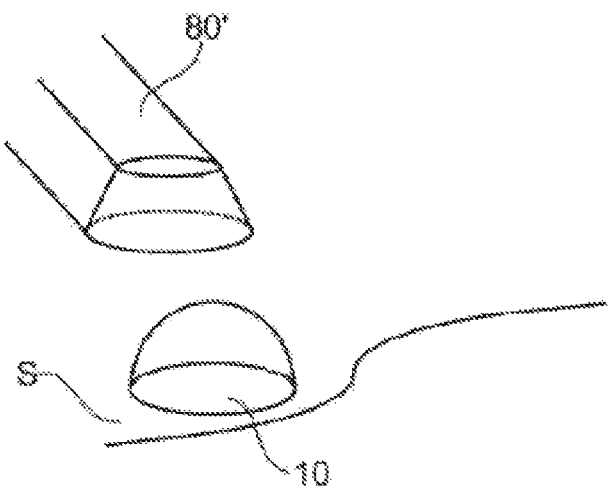
FIG. 5 is a diagrammatic perspective view showing a variant embodiment of the foot of the effector.

In particular, there may be produced, instead and in place of an effector foot 80 in the form of a part-spherical dome bearing against studs 10 of part-spherical shape, an effector foot 80' of frustoconical shape that can also come to bear against one of the part-spherical studs 10 and define the ball joint connection 11 according to the invention, as shown in FIG. 5.

This variant embodiment of FIG. 5 is advantageous because the frustoconical shape of the effector foot 80' bears against each part-spherical stud 10 along a line.

The invention is not limited to the examples that have just been described; features of the examples shown may notably be combined with one another in variants that are not shown.

The invention claimed is:

1. A surface-machining assembly, comprising:
an effector comprising:
an electrospindle comprising a body with at one of its ends means for coupling to a cutting tool (O),
a first support connected to the body of the electrospindle by a sliding connection allowing movement in translation of the electrospindle along the rotation axis Z of the tool,
a second support connected to the first by a sliding connection allowing movement in translation of the first support along an axis X perpendicular to the rotation axis Z of the tool,
a chassis one end of which constitutes a foot and the other end of which constitutes a head adapted to be coupled to the free end of a robot arm, the chassis being connected to the second support by a sliding connection allowing movement in translation of the second support along an axis Y perpendicular both to the translation axis X of the first support and the axis Z of translation of the electrospindle and of rotation of the tool;
at least one element enabling the foot of the effector to bear on the surface to be machined or on tools that support the surface, the bearing element and the foot of the effector being configured so that the effector is connected to the surface to be machined by a ball joint connection when the foot of the effector is bearing on the surface.

2. The assembly as claimed in claim 1, wherein the end of the foot of the effector is constituted of a ball joint mounted inside a part and defining between them the ball joint connection, the part defining a bearing connection against the surface to be machined or against the tools.

3. The assembly as claimed in claim 1, wherein the end of the foot of the effector is conformed as a part-spherical dome, each bearing element being a stud in the form of a part-spherical dome, arranged on the surface to be machined or against the tools, the shape of the stud being complementary that of the end of the foot of the effector and defining the ball joint connection.

4. The assembly as claimed in claim 1, wherein the end of the foot of the effector is frustoconical, each bearing element being a stud in the form of a part-spherical dome, arranged on the surface to be machined or against the tools, the shape of the stud being complementary to that at the end of the foot of the effector and defining the ball joint connection.

5. The assembly as claimed in claim 3, comprising one or more studs formed integrally with the tools around the surface to be machined.

6. The assembly as claimed in claim 3, comprising one or more studs placed on the surface to be machined or on the tools around it.

7. The assembly as claimed in claim 1, wherein an angular amplitude of the ball joint connection is between ±10 and ±45° inclusive.

8. The assembly as claimed in claim 1, wherein the first support supports the driving device in translation along the axis Z, the second support supports the driving device in translation along the axis X, and the chassis supports the driving device in translation along the axis Y.

9. The assembly as claimed in claim 1, wherein each drive device in translation is a motor connected to a ball screw and nut system or a screw system with satellite rollers.

10. A machining installation comprising a robot with six degrees of freedom, termed a six-axis robot, and an assembly as claimed in claim 1, the head of the effector being coupled to the free end of the arm of the six-axis robot.

11. A method of machining a surface executed by the installation according to claim 10, comprising the following steps:
    a/ measuring the positions of the centers of the bearing surfaces of each of a plurality of studs;
    b/ integrating the plurality of studs onto the tools to be placed around the surface to be machined;
    c/ resting the effector foot on one of the studs and then machining the surface part in the vicinity of said stud, by means of a cutting tool coupled to the electrospindle, the machining being carried out with movement of the electrospindle in translation along the axis X and/or Y and/or Z and/or with rotation of the effector around the center of the ball joint and/or with rotation of the effector around its axis passing through the center of the ball joint and the center of the flange fixing the head to the arm of the robot;
    d/ successively moving the effector by means of the robot so as to repeat the step c/ with the effector foot bearing on each of the plurality of studs, in order to execute the required machining of the whole surface.

12. The assembly as claimed in claim 1, wherein the ball joint connection allows rotation of the effector about two rotation axes, said rotation being relative to the surface to be machined.

13. A surface-machining assembly, comprising:
    an effector comprising:
        an electrospindle comprising a body with at one of its ends means for coupling to a cutting tool (O),
        a first support connected to the body of the electrospindle by a sliding connection allowing movement in translation of the electrospindle along the rotation axis Z of the tool,
        a second support connected to the first by a sliding connection allowing movement in translation of the first support along an axis X perpendicular to the rotation axis Z of the tool,
        a chassis one end of which constitutes a single foot and the other end of which constitutes a head adapted to be coupled to the free end of a robot arm, the chassis being connected to the second support by a sliding connection allowing movement in translation of the second support along an axis Y perpendicular both to the translation axis X of the first support and the axis Z of translation of the electrospindle and of rotation of the tool;
    at least one element enabling the single foot of the effector to bear on the surface to be machined or on tools that support the surface, the bearing element and the single foot of the effector being configured so that the effector is connected to the surface to be machined by a ball joint connection when the single foot of the effector is bearing on the surface.

* * * * *